US008458313B2

(12) United States Patent
Adams et al.

(10) Patent No.: US 8,458,313 B2
(45) Date of Patent: Jun. 4, 2013

(54) SYNCHRONIZATION OF DATA AMONG DISPARATE DATA SOURCES

(75) Inventors: Gregory T. Adams, Long Valley, NJ (US); Robert Prezioso, Long Valley, NJ (US)

(73) Assignee: Global Pay, Inc., Short Hills, NJ (US)

( * ) Notice: Subject to any disclaimer, the term of this patent is extended or adjusted under 35 U.S.C. 154(b) by 449 days.

(21) Appl. No.: 12/879,773

(22) Filed: Sep. 10, 2010

(65) Prior Publication Data

US 2011/0066699 A1    Mar. 17, 2011

Related U.S. Application Data

(60) Provisional application No. 61/241,679, filed on Sep. 11, 2009.

(51) Int. Cl.
*G06F 15/16* (2006.01)
(52) U.S. Cl.
USPC ........... 709/223; 709/203; 709/230; 709/245; 709/246; 709/248
(58) Field of Classification Search
USPC ................. 709/203, 223, 230, 245, 246, 248
See application file for complete search history.

(56) References Cited

U.S. PATENT DOCUMENTS

| 2004/0217163 | A1 * | 11/2004 | Savage | 235/380 |
| 2012/0290702 | A1 * | 11/2012 | Vincent | 709/223 |
| 2012/0290749 | A1 * | 11/2012 | Moench et al. | 710/63 |

* cited by examiner

*Primary Examiner* — Michael Won
(74) *Attorney, Agent, or Firm* — David H. Judson

(57) ABSTRACT

A method for data exchange among computing systems, such as first and second computing systems, that each operate management systems that normally communicate given data to a target computing system in first and second disparate formats. Representative management systems may be a human resource management system (HRMS), and the target computing system operates an application, such as a payroll application, that interacts with the HRMS of each computing system. The first and second computing systems typically are located in first and second geographic locations distinct from one another. The method begins by instrumenting each of the first and second computing systems to respond to a trigger event from an ODBC-compliant data source to generate a WSDL (Web Services Description Language) object that encapsulates the given data, such as human resource (HR) data. The WSDL objects that are generated as a result of the trigger events are received, preferably via a Web service, at the target computing system. The target computing system then processes information in the WSDL objects.

6 Claims, 9 Drawing Sheets

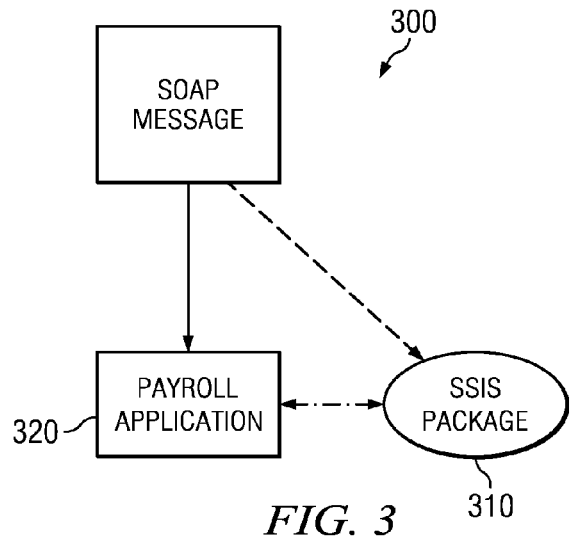

- <wsdl: operation name="UploadVendorEmployeeFile">  410
<wsdl:input message="tns:UploadVendorEmployeeFileSoapIn" />
<wsdl: output message="tns: UploadVendorEmployeeFileSoapOut" />
</wsdl: operation>
</wsdl:portType>
- <wsdl: binding name="EmployeeServiceSoap" type="tns:EmployeeServiceSoap">
<soap:binding transport="http://schemas.xmlsoap.org/soap/http" />
- <wsdl: operation name="UploadVendorEmployeeFile">
<soap:operation soapAction="http://tempuri.org/UploadVendorEmployeeFile" style="document" />
```

FIG. 4

```
Connect ▼

⊞ ☐ gp_staging
⊟ ☐ panther
  ⊞ ☐ Database Diagrams
  ⊞ ☐ Tables
  ⊞ ☐ Views
  ⊞ ☐ Synonyms
  ⊟ ☐ Programmability
    ⊟ ☐ Stored Procedures
      ⊞ ☐ System Stored Procedures
      ⊞ ☐ dbo.SearchAllStoredProcedu
      ⊞ ☐ dbo.SearchAllTables
      ⊞ ☐ dbo.SysMakeAuditTriggers
      ⊞ ☐ dbo.SysMakeLockProcedure
      ⊞ ☐ dbo.SysMakeLockProcedure
      ⊞ ☐ dbo.sysSetCurrentYear
      ⊟ ☐ dbo.usp_Authenticate_user
        ⊞ ☐ Parameters
      ⊞ ☐ dbo.usp_county_active_ge
      ⊞ ☐ dbo.usp_user_counrty_get
      ⊞ ☐ dbo.usp_user_login
```

```
USE [panther]
GO
/****** Object : StoredProcedure [dbo] . [usp_authenticate_user]   Script Date: 08/03/2009 16:03:22 ******/
SET ANSI_NULLS ON
GO
SET QUOTED_IDENTIFIER ON
GO
ALTER PROCEDURE [dbo] . [usp_authenticate_user]
(
    @p_userid   VARCHAR(15) ,
    @p_password VARCHAR(15)
)
AS
SET NOCOUNT ON
    SELECTDISTINCT EmployeeId FROM PayrollEmployees WHERE EmployeeUserName - @p_userid AND Employee Password
RETURN
```

*FIG. 5*

```
USE [       ]
GO
/****** Object:  StoredProcedure [enterprise] . [        _Update_Addresses]
SET ANSI_NULLS ON
GO
SET QUOTED_IDENTIFIER ON
GO ALTER PROCEDURE [enterprise] . [         _Update_Addresses]
          @Employee nvarchar (50) ,
          @EffectiveFrom nvarchar (50) ,
          @EffectiveTo nvarchar (50) ,
          @AddressType nvarchar (50) ,
          @AddressLine1 nvarchar (50) ,
          @AddressLine2 nvarchar (50) ,
          @AddressLine3 nvarchar (50) ,
          @AddressLine4 nvarchar (50) ,
          @TownCity navarchar (50) ,
          @StateProvinceCode nvarchar (50) ,
          @StateProvinceDescription nvarchar (50) ,
          @ZipCode nvarchar (50) ,
          @Country nvarchar (50) ,

AS
     BEGIN

SET NOCOUNT ON:

INSERT INTO [Enterprise_Dev] . [dbo] . [          _Addresses]
               ([EmployeeID]
               , [EffectiveFrom]
               , [EffectiveTo]
               , [AddressType]
               , [AddressLine1]
               , [AddressLine2]
               , [AddressLine3]
               , [AddressLine4]
               , [TownCity]
               , [StateProvinceCode]
               , [StateProvinceDescription]
               , [ZipCode]
               , [Country])
          VALUES
               (
@EmployeeID,
          @EffectiveFrom,
          @EffectiveTo,
```

Notice the effective dating within the "Alter" Procedure. If the effective dating is changed in the Alter Procedure, those changes are placed into the application in real time. Those dates would take effect according to the given date.

Here is a sample of what the SOAP file would look like.

UploadVendorEmployeeFile

Test

The test form is only available for requests from the local machine.

SOAP 1.1

The "uploadvendoremployeeFile" is how the file is uploaded from point A, to point B. When the packet is parsed on the payroll side, the "uploadvendoremployeeFile" is received within the IIS app and then transmitted.

The following is a sample SOAP 1.1 request and response. The placeholders shown need to be replaced with actual values.

```
POST /NSVendorService/EmployeeService.asmx HTTP/1.1
Host: globa8-vm01.inetu.net
Content-Type: text/xml; charset=utf-8
Content-Length: length
SOAPAction: "http://tempuri.org/UploadVendorEmployeeFile"

<?xml version="1.0" encoding="utf-8"?>
<soap:Envelope xmlns:xsi="http://www.w3.org/2001/XMLSchema-instance" xmlns:xsd="http://www.w3.org/2001/XMLSchema" xmlns:soap="http://schema.xmlsoap
  <soap:Body>
    <UploadVendorEmployeeFile xmlns="http://tempuri.org/">
      <f>base64Binary</f>
      <vendorid>string</vendorid>
    </UploadVendorEmployeeFile>
  </soap:Body>
</soap:Envelope>
```

```
HTTP/1.1 200 OK
Content-Type: text/xml; charset=utf-8
Content-Length: length <?xml version="1.0" encoding="utf-8"?>
<soap: Envelope xmlns:xsi="http://www.w3.org/2001/XMLSchema-instance" xmlns:xsd="http://www.w3.org/2001/XMLS Schema" xmlns:soap="http://schema.xmlsoap
  <soap:Body>
    <UploadVendorEmployeeFileResponse xmlns="http://tempuri.org/">
      <UploadVendorEmployeeFileResult>string</UploadVendorEmployeeFileResult>
    </UploadVendorEmployeeFileResponse>
  </soap:Body>
</soap:Envelope>
```

FIG. 8

```
    </s:element>
  </s:schema>
</wsdl:types>
- <wsdl:message name="UploadVendorEmployeeFileSoapIn">
    <wsdl:part name="parameters" element="tns:UploadVendorEmployeeFile" />
  </wsdl:message>
- <wsdl:message name="UploadVendorEmployeeFileSoapOut" />
    <wsdl:part name="parameters" element="tns:UploadVendorEmployeeFileResponse" />
  </wsdl:message>
- <wsdl:portType name="EmployeeServiceSoap">
  - <wsdl:operation name="UploadVendorEmployeeFile">
      <wsdl:input message="tns:UploadVendorEmployeeFileSoapIn" />
      <wsdl:output message="tns:UploadVendorEmployeeFileSoapOut" />
    </wsdl:operation>
  </wsdl:portType>
- <wsdl:binding name="EmployeeServiceSoap" type="tns.EmployeeServiceSoap">
    <soap:binding transport="http://schemas.xmlsoap.org/soap/http" />
  - <wsdl:operation name="UploadVendorEmployeeFile">
      <soap:operation soapAction="http://tempuri.org/UploadVendorEmployeeFile" style="d
    - <wsdl:input>
        <soap:body use="literal" />
      </wsdl:input>
    - <wsdl:output>
        <soap:body use="literal" />
      </wsdl:output>
    </wsdl:operation>
  </wsdl:binding>
- <wsdl:binding name="EmployeeServiceSoap12" type="tns:EmployeeServiceSoap">
    <soap12:binding transport="http://schemas.xmlsoap.org/soap/http" />
  - <wsdl:operation name="UploadVendorEmployeeFile">
      <soap12:operation soapAction="http://tempuri.org/UploadVendorEmployeeFile" style="document" />
    - <wsdl:input>
        <soap12:body use="literal" />
      </wsdl:input>
    - <wsdl:output>
        <soap12:body use="literal" />
      </wsdl:output>
    </wsdl:operation>
  </wsdl:binding>
- <wsdl:service name="EmployeeService">
  - <wsdl:port name="EmployeeServiceSoap" binding="tns:EmployeeServiceSoap">
      <soap:address location="http://globa8-vm01.inetu.net/WSVendorService/EmployeeService.asmx" />
```

Notice the operation name within the WSDL XML. It matches the operation name within the SOAP message.

TNS is a namespace prefix which binds "employeeservicesoap" name to a particular namespace, declared using xml name spacing type="tns:..." declaration. The "tns" prefix stands for Target Namespace.

Here is the location on how the SOAP packet communicates to the payroll side. This location is the IIS server within the GP infrastructure, which then transmits to the SQL server.

```
<s:element name="UploadEmployeeTimesheetResponse">
  <s:complexType>
    <s:sequence>
      <s:element minOccurs="0" maxOccurs="1" name="UploadEmployeeTimesheetResult" type="s:string" />
    </s:sequence>
  </s:complexType>
</s:element>
</s:schema>
</wsdl:types>
<wsdl:message name="UploadEmployeeTimesheetSoapIn">
<wsdl:part name="parameters" element="tns:UploadEmployeeTimesheet" />
</wsdl:message>
<wsdl:message name="UploadEmployeeTimesheetSoapOut">
<wsdl:part name="parameters" element="tns:UploadEmployeeTimesheetResponse" />
</wsdl:message>
<wsdl:portType name="EmployeeTimesheetServiceSoap">
<wsdl:operation name="UploadEmployeeTimesheet">
  <wsdl:input message="tns:UploadEmployeeTimesheetSoapIn" />
  <wsdl:output message="tns:UploadEmployeeTimesheetSoapOut" />
</wsdl:operation>
</wsdl:portType>
<wsdl:binding name="EmployeeTimesheetServiceSoap" type="tns:EmployeeTimesheetServiceSoap">
<soap:binding transport="http://schemas.xmlsoap.org/soap/http" />
<wsdl:operation name="UploadEmployeeTimesheet">
  <soap:operation soapAction="http://tempuri.org/UploadEmployeeTimesheet" style="document" />
```

This diagram shows the invention using "real time" delivery which is illustrated as UploadEmployeeTimesheet and binds to UploadEmployeeTimeService.

… # SYNCHRONIZATION OF DATA AMONG DISPARATE DATA SOURCES

This application is based on and claims priority to Ser. No. 61/241,679, filed Sep. 11, 2009.

This application includes subject matter protected by copyright. All rights are reserved.

BACKGROUND

1. Technical Field

This disclosure relates generally to data interchange technologies.

2. Background of the Related Art

Data quality and accessibility are integral to organizational success, yet too often both are sorely lacking, which hinders the organization's ability to execute core objectives and achieve goals. Indeed, a business may be at risk by lack of visibility into key metrics and analytics (such as, without limitation, revenue forecasting, regulatory compliance, currency exchange rates, etc.), and this lack of visibility can compromise decision-making.

A common problem is lack of reliable, scalable and available data exchange across multiple computer systems, especially where an organization has many offices that are widely separated. While such data exchange is possible, it is typically cumbersome, if it even exists. Each computing platform must be configured to seamlessly communicate with the others, in a bidirectional fashion, ensuring that all shared data remains accurate. The wide availability of Internet-based computing resources and associated Web-based technologies has improved on this situation, but many companies still operate systems with decentralized, disjointed data that stifles effective use of working capital.

There remains a need in the art for new techniques for data interchange that can provide organizations improved view into their data. The subject matter of this disclosure addresses this problem.

BRIEF SUMMARY

This disclosure describes a method for data exchange among computing systems, such as first and second computing systems that operate management systems that normally communicate given data to a target computing system in first and second disparate formats. Representative management systems may be a human resource management system (HRMS), and the target computing system operates an application, such as a payroll application, that interacts with the HRMS of each computing system. The first and second computing systems typically are located in first and second geographic locations distinct from one another. The method begins by instrumenting each of the first and second computing systems to respond to a trigger event from an ODBC-compliant data source to generate a WSDL (Web Services Description Language) object that encapsulates the given data, such as human resource (HR) data. The WSDL objects that are generated as a result of the trigger events are received, preferably via a Web service, at the target computing system. The target computing system then processes information in the WSDL objects.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 3 is a simple block diagram that shows the delivery of the SOAP message in one of two ways: in real-time, or by file delivery;

FIG. 4 is a piece of XML code 400 taken from the WSDL;

FIG. 5 is a portion of the Stored Procedure that is used to define a user to the application;

FIG. 6 is a portion of the Stored Procedure that illustrates how an employee address is changed, which triggers an update to the payroll application;

FIG. 7 is a sample of the SOAP file for the update;

FIG. 8 is a sample of the WSDL object for this particular transaction;

FIG. 9 is the XML associated with a web service for updating an employee timesheet;

FIG. 11 illustrates the display interfaces for calling the service.

DESCRIPTION OF AN EMBODIMENT

Figure 1:
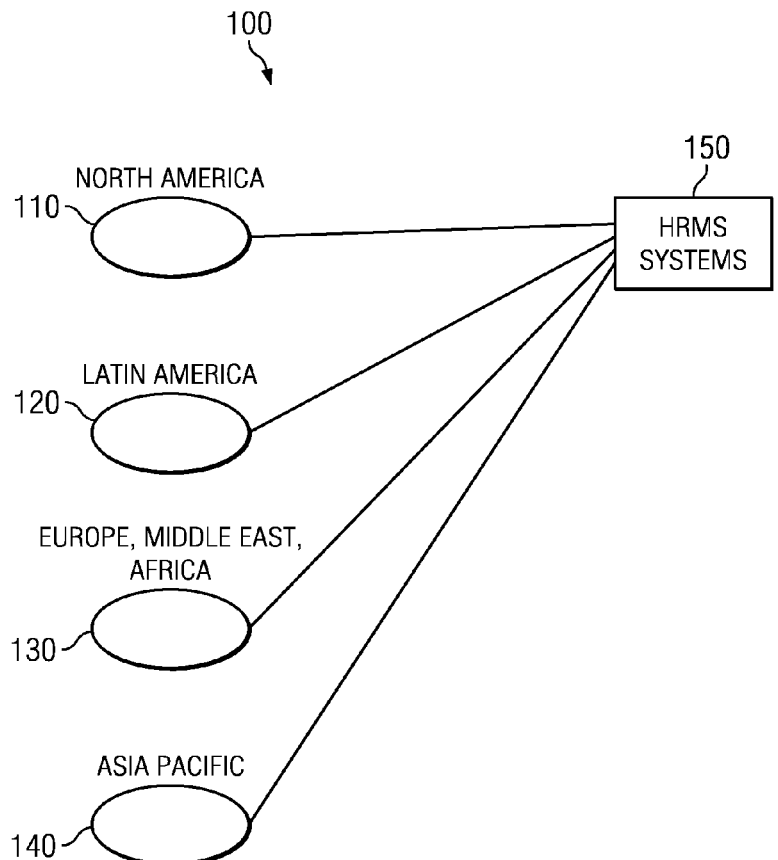
FIG. 1 is a block diagram that shows an HRMS global operating environment and the representative entities which make up this system.

By way of background, this paragraph describes several enabling technologies that are used herein. Extensible markup language (XML) facilitates the exchange of information in a tree structure. An XML document typically contains a single root element. Each element has a name, a set of attributes, and a value consisting of character data, and a set of child elements. The interpretation of the information conveyed in an element is derived by evaluating its name, attributes, value and position in the document. A Web service is described using a standard, formal XML notion, called its service description. A service description typically conforms to a machine-processable format such as the Web Services Description Language (WSDL). WSDL describes the public interface to necessary to interact with the service, including message formats that detail the operations, transport protocols and location. The supported operations and messages are described abstractly and then bound to a concrete network protocol and message format. The WSDL is essentially acting as the contract between two different software applications, and it describes the manner in which these applications can utilize Web services to seamlessly interoperate and/or exchange information. The most current release, WSDL 2.0, enables individuals to separate the depiction of the abstract functionality offered by a service from concrete details of a service description. WSDL 2.0 describes a particular Web service in two primary stages, abstract and concrete. Within each stage, the description utilizes various concepts to achieve extensibility, and to facilitate maximum re-usability of the description, while segregating discrete design concerns.

A client program connecting to a Web service reads the WSDL to determine what functions are available on the server. Computing entities running the Web service communicate with one another using XML-based messaging over a given transport protocol. Messages typically conform to the Simple Object Access Protocol (SOAP) and travel over HTTP (over the public Internet) or other reliable transport mechanisms (such as CORBA, for transport over an enterprise intranet). The SOAP actions are defined and the manner in which the message is encoded is derived. Each specific operation can be analogous to a method or function call in a traditional programming language. A message exchange pattern identifies the sequence and cardinality of messages sent and/or received, as well as whom they are sent to and/or received from. The Web service hides the implementation details of the service, allowing it to be used independently of the hardware or software platform on which it is implemented and also independently of the programming language in which it is written. This allows and encourages Web services-based application to be loosely-coupled, component-oriented, cross-technology implementations. Web services typically fulfill a specific task or a set of tasks. They can be used alone or with other Web services to carry out a complex aggregation or a business transaction. A client program connecting to a Web service reads the WSDL to determine what functions are available on the server.

The subject matter herein is described in the context data transmission of an organization with multiple offices in different countries, and where each such office has responsibility for local human resource (HR) requirements (hiring, managing, etc.). Each Office has associated therewith a Human Resource Management System (HRMS), which is a computing system and associated set of utilities and data. The local HRMS may be managed by the organization directly, or it may be an outsourced operation. The individual HRMS systems provide data to one or more other typically global enterprise applications, such as a payroll application. Thus, an HRMS in a first country may be responsible for managing HR data for the employees of that office, while the HRMS in a second country may be responsible for managing HR data for the employees there; all of the employees (from both offices) however are presumed to be managed (for payroll purposes) by the payroll application. Of course, this operating embodiment is merely illustrative, and it should not be taken to limit the scope of the disclosure, as the techniques described below can be used to link any information system to any other information system or technology.

FIG. 1 is a block diagram that shows an HRMS global operating environment 100 and the representative entities which make up this system, in this case: 110 North America, 120 Latin America, 130 Europe Middle East Africa, and 140 Asia Pacific. These systems are linked by the disclosed solution, as represented by reference numeral 150, which is a global HRMS system.

Figure 2:
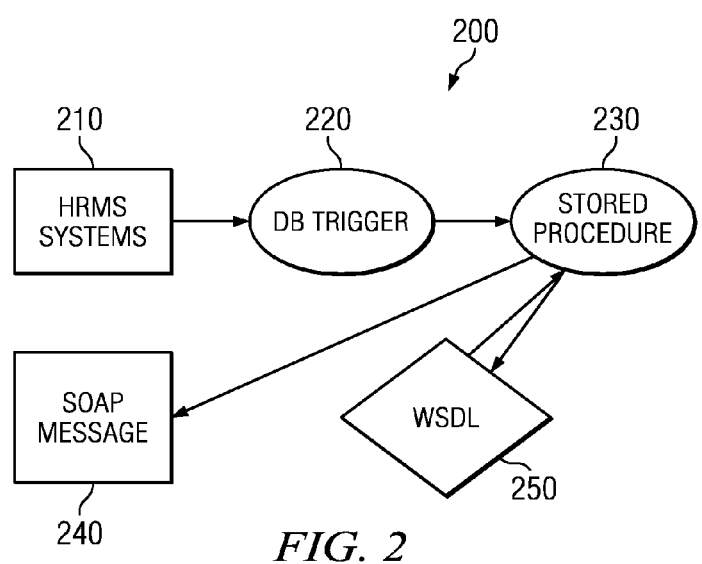
FIG. 2 is a diagram that shows how data is organized from the HRMS solution and prepared to be sent to the payroll solution according to the teachings herein.

FIG. 2 is a diagram that shows how data is organized from the HRMS solution and prepared to be sent to the payroll solution according to the teachings herein. In particular, the HRMS customers 210 that use the solution are assumed to have a database trigger 220 that calls a local database system associated with the local HRMS system. The HRMS systems are assumed to have or use one or more disparate (or even incompatible) database systems, data structures or the like. The DB trigger 220 typically resides within the HRMS database, such as procedures that call the connected database. For example, these procedures may be one or more of the following: insert, update, delete or others. A Stored Procedure 230 is a predefined script within the HRMS database that is called when the database trigger 220 is launched. Further details of the Stored Procedure are set forth below. When triggered, the Stored Procedure 230 calls a Web Services Definition Language (WSDL) object 250 which will act as a contract between the HRMS and the Payroll system, and which can either upload a data file or deliver it in real-time (or substantially real-time). Note that the data file is another way to utilize the disclosed technique. This data file can be stored within the payroll solution staging area. The WSDL object 250 typically is written in XML, and it is used to connect two endpoints: one endpoint being one of the database systems (locally, or "in-country") and the other endpoint being the payroll application or associated processing service. The WSDL object encapsulates one or more messages that then deliver the information into the payroll application solution.

More generally, the Stored Procedure comprises a set of one or more routines that can be used to update data to a remote application. Typically, the Stored Procedure is responsive to an ODBC-compliant data source.

In one embodiment, the source database is continually polled, queried for updates to the underlying data. Upon capturing a change, the Stored Procedure is triggered, which facilitates the actual transaction (an update). Updated information in the source (local) database seamlessly flows across a secure connection to the target database (in this example, the payroll application). Once populated, built-in procedures verify the integrity of the data and audit logs capture all pertinent aspects of the data exchange. Using this subject matter, data transmission is easier and more secure than the known prior art, and organizations can use the techniques to obtain an unprecedented view into their key data elements and metrics that are important to business process decision-making.

Thus, for example, the WSDL object encapsulates an update message when a new employee is added to the HRMS system in a local jurisdiction. In this example, the update message, such as "UploadEmployeeVendorFile," delivers the information into the payroll solution database. In particular, preferably the WSDL object 250 consolidates the information into a Simple Object Access Protocol (SOAP) message 240 that is associated with a URL supplied to the local HRMS database system. This message is communicated in a secure manner, preferably using a VPN tunnel, SSL, TPS, or the like.

FIG. 3 is a simple block diagram that shows the delivery of the SOAP message in one of two ways: in real-time, or by file delivery. For traditional real-time data transfer, as illustrated in FIG. 2, the XML message is sent directly to the application 320 and bypasses the SSIS directory. For file delivery, the information is sent to a staging area within the payroll database, where an SQL Server Integration Service (SSIS) package 310 routes the data to the 320 payroll application. The SSIS package dictates how the information should be formatted.

FIG. 4 is a piece of XML code 400 taken from the WSDL. This sample shows how the WSDL communicates on the payroll provider's backend, e.g., by using specific statements such as the "UploadEmployeeVendorFile" 410 statement. This file is located within the host's receiving web site. When the file is extracted, it checks itself against the stored procedures and then delivers the new data into the correct fields.

FIG. 5 is a portion of the Stored Procedure that is used to define a user to the application.

FIG. 6 is a portion of the Stored Procedure that illustrates how an employee address is changed, which triggers an update to the payroll application.

FIG. 7 is a sample of the SOAP file for the update.

FIG. 8 is a sample of the WSDL object for this particular transaction.

Figure 10:
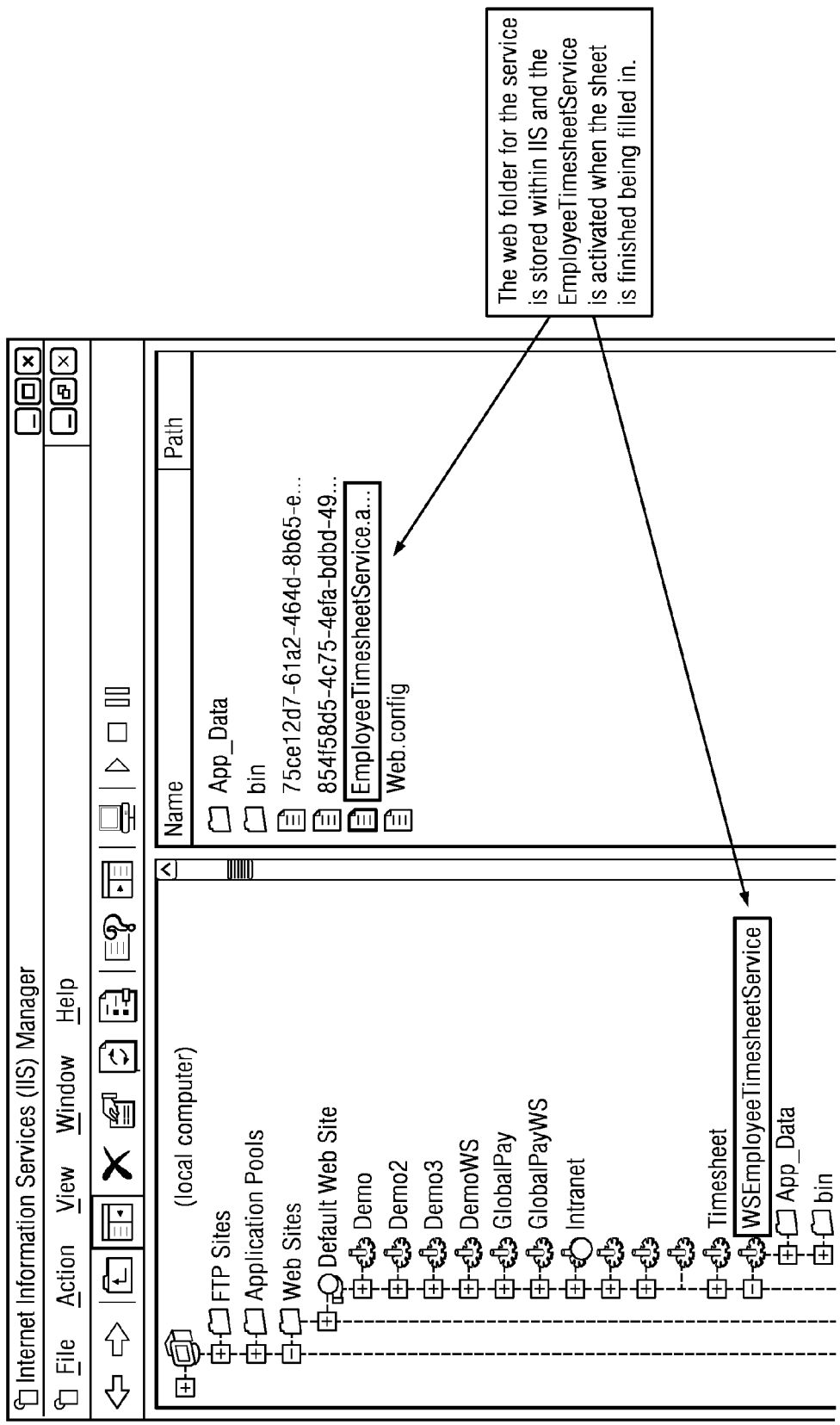
FIG. 10 illustrates a web server directory for the Employee Timesheet service.

FIGS. 9, 10 and 11 illustrate an example of how real-time data delivery works. Thus, for example, FIG. 9 is the XML associated with a web service for updating an employee timesheet. FIG. 10 illustrates a Microsoft IIS (a web server) directory for the Employee Timesheet service. The service is activated when the timesheet (not shown) on the client is finished being filled in. FIG. 11 illustrates the display interfaces for calling the service. The SOAP message is shown on the right panel. Of course, this is just a representative example of the operation, as many other functions are implemented as web services in a similar manner.

In one embodiment, the Stored Procedure continually polls the source database, querying for updates to the underlying data. Upon capturing a change, the Stored Procedure is triggered, which facilitates the actual transaction (an update). Updated information in the source (local) database seamlessly flows across a secure connection to the target database (in this example, the payroll application). Once populated, built-in procedures verify the integrity of the data and audit logs capture all pertinent aspects of the data exchange. Using this subject matter, data transmission is easier and more secure than the known prior art, and organizations can use the techniques to obtain an unprecedented view into their key data elements and metrics that are important to business process decision-making.

With the invention, organizations can capitalize upon today's state-of-the-art Web service technologies to define synchronization protocols to deliver a highly flexible application that is easily linked to any ODBC-compliant data source. With virtually unlimited functionality and configurability, companies can customize specific business rules to facilitate data exchange, while existing procedures maintain data and reporting integrity.

There are many ways in which the data interchange service may be implemented, and the disclosed subject matter is not limited to any particular one. For purposes of illustration, the subject matter herein is shown as being implemented in a distributed computer environment. The invention may be implemented as a product or a managed or hosted service (such as an ASP model), or some combination thereof. A representative system in which the subject matter is implemented comprises any set of one or more computing resources including machines, processes, programs, functions, data structures, and the like. Of course, any other hardware, software, systems, devices and the like may be used. More generally, the subject matter may be implemented with any collection of autonomous or other computers (together with their associated software, systems, protocols and techniques) linked by a network or networks.

In a hosted solution, a service provider infrastructure serves as the receiving side of the Web service and may operate the payroll application on the organization's behalf.

As previously noted, the hardware and software systems in which the invention is illustrated are merely representative. The invention may be practiced, typically in software, on one or more machines. Generalizing, a machine typically comprises commodity hardware and software, storage (e.g., disks, disk arrays, and the like) and memory (RAM, ROM, and the like). The particular machines used in the system are not a limitation of the present invention. A given machine includes network interfaces and software to connect the machine to a network in the usual manner. The cloud services may be implemented as a managed service (e.g., in a hosted model) using a set of machines, which are connected or connectable to one or more networks. More generally, the product or service is provided using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., AJAX technologies, Java applets or servlets, linkable libraries, native code, or the like, depending on platform), that provide the functionality of a given system or subsystem. As described, the product or service may be implemented in a standalone server, or across a distributed set of machines. Typically, a server connects to the publicly-routable Internet, a corporate intranet, a private network, or any combination thereof, depending on the desired implementation environment.

There may be intermediate processing entities within the data path described above. Thus, for example, SOAP messages may be sent from an initial SOAP sender to an ultimate SOAP receiver along a SOAP message path comprising zero or more SOAP intermediaries that process and potentially transform the SOAP message. Moreover, the use of SOAP here is merely illustrative, and it should not be taken to limit the scope of the present invention, which does not depend on the particular transport mechanism used to transfer a protected message. The sender, receiver and intermediaries are computing entities, such as data processing systems each comprising hardware and software, which entities communicate with one another over a network, such as the publicly-routed Internet, an intranet, an extranet, a private network, or any other communications medium or link. A data processing system typically comprises one or more processors, an operating system, an application server, one or more applications and one or more utilities. A given data processing system may be a sender or sending entity, in which case the system is deemed to be on a "sender side" of the transmission, or a receiver or receiving entity, in which case the system is deemed to be on a "receiver side." The applications on the data processing system provide native support for Web Services including.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions may be combined or shared in given instructions, program sequences, code portions, and the like.

Having described our invention, what we now claim is as follows:

1. A method for data exchange among computing systems, wherein at least first and second computing systems operate management systems that normally communicate given data to a target computing system in first and second disparate formats, comprising:
   instrumenting each of the first and second computing systems to respond to a trigger event from an ODBC-compliant data source to generate a WSDL object that encapsulates the given data;
   receiving WSDL objects at the target computing system that are generated as a result of the trigger events; and
   processing information in the WSDL objects at the target computing system.

2. The method as described in claim 1 wherein each of the first and second computing systems operates a human resource management system (HRMS) and the target computing system operates a payroll application.

3. The method as described in claim 1 wherein the WSDL object is received at the target computing system as a Web service.

4. The method as described in claim 1 wherein the target computing system is operated in a managed service environment.

5. The method as described in claim 1 wherein the given data is HR data.

6. The method as described in claim 1 wherein the first and second computing systems are located in first and second geographic locations distinct from one another.

* * * * *